US012475426B2

(12) United States Patent
Wang et al.

(10) Patent No.: US 12,475,426 B2
(45) Date of Patent: Nov. 18, 2025

(54) METHOD FOR GENERATING PORTRAIT OF MECHANICAL EQUIPMENT

(71) Applicant: YANTAI JEREH OILFIELD SERVICES GROUP CO., LTD., Yantai (CN)

(72) Inventors: Xinmeng Wang, Yantai (CN); Zongwen Wang, Yantai (CN); Hailong Li, Yantai (CN)

(73) Assignee: YANTAI JEREH OILFIELD SERVICES GROUP CO., LTD., Yantai (CN)

( * ) Notice: Subject to any disclaimer, the term of this patent is extended or adjusted under 35 U.S.C. 154(b) by 304 days.

(21) Appl. No.: 18/160,876

(22) Filed: Jan. 27, 2023

(65) Prior Publication Data

US 2023/0259862 A1 Aug. 17, 2023

Related U.S. Application Data

(63) Continuation of application No. PCT/CN2022/090147, filed on Apr. 29, 2022.

(30) Foreign Application Priority Data

Feb. 14, 2022 (CN) .......................... 202210132467.6

(51) Int. Cl.
*G06Q 10/0639* (2023.01)
*G06N 3/084* (2023.01)

(52) U.S. Cl.
CPC ....... *G06Q 10/06395* (2013.01); *G06N 3/084* (2013.01)

(58) Field of Classification Search
CPC ........... G06N 3/00–20/00; G06Q 10/00–50/00
(Continued)

(56) References Cited

U.S. PATENT DOCUMENTS 9,645,575 B2 * 5/2017 Watson ................. E21B 47/008
9,756,518 B1 * 9/2017 Sheen ................... H04W 16/18
(Continued)

FOREIGN PATENT DOCUMENTS

CN 107423442 A 12/2017
CN 108416620 A 8/2018
(Continued)

OTHER PUBLICATIONS

Written Opinion and International Search Report for PCT Application No. PCT/CN2022/090147 mailed on Aug. 29, 2022.
(Continued)

*Primary Examiner* — Alan S Miller
(74) *Attorney, Agent, or Firm* — Sheppard Mullin Richter & Hampton LLP

(57) ABSTRACT

A method for generating a portrait of mechanical equipment includes: obtaining all data information related to mechanical equipment; performing data fusion on the data information related to the mechanical equipment to obtain a multi-source data information set; obtaining target attribute data and target state data of the mechanical equipment based on the multi-source data information set; generating attribute labels of the mechanical equipment based on the obtained target attribute data; inputting current target state data of the mechanical equipment into a trained neural network model to obtain current state labels of the mechanical equipment, where the current state labels include state label values of the mechanical equipment; and generating an equipment portrait of the mechanical equipment through attribute label values of the obtained attribute labels and the state label values of the obtained current state labels.

18 Claims, 5 Drawing Sheets

(58) Field of Classification Search
USPC ................................................. 705/7.11–7.42
See application file for complete search history.

(56) References Cited

U.S. PATENT DOCUMENTS

| | | | | |
|---|---|---|---|---|
| 9,892,238 | B2* | 2/2018 | Lahiri | G05B 23/024 |
| 10,430,690 | B1* | 10/2019 | Chen | G06F 18/2415 |
| 11,334,407 | B2* | 5/2022 | Okanohara | G06F 11/0703 |
| 11,526,754 | B2* | 12/2022 | Odibat | G06N 3/08 |
| 11,544,491 | B2* | 1/2023 | Pouyan | G06N 20/00 |
| 2009/0300417 | A1* | 12/2009 | Bonissone | G05B 23/0254 |
| | | | | 714/E11.178 |
| 2010/0023307 | A1* | 1/2010 | Lee | G06F 18/2321 |
| | | | | 703/7 |
| 2017/0046619 | A1* | 2/2017 | Towailib | G06N 5/04 |
| 2017/0067325 | A1* | 3/2017 | Garcia Zurita | E21B 43/00 |
| 2017/0109646 | A1* | 4/2017 | David | G03F 7/70625 |
| 2018/0335018 | A1* | 11/2018 | Cao | G05B 23/0286 |
| 2019/0384255 | A1* | 12/2019 | Krishnaswamy | G05B 23/024 |
| 2021/0181732 | A1* | 6/2021 | Sadazuka | G05B 23/0221 |
| 2021/0216813 | A1* | 7/2021 | Pouyan | G06N 5/01 |
| 2021/0248457 | A1* | 8/2021 | Odibat | G06N 3/045 |
| 2021/0319368 | A1* | 10/2021 | Motegi | G05B 23/024 |
| 2021/0349919 | A1* | 11/2021 | Mandal | G06F 16/285 |

FOREIGN PATENT DOCUMENTS

| | | | |
|---|---|---|---|
| CN | 109614509 A | 4/2019 | |
| CN | 110544109 A | 12/2019 | |
| CN | 112364008 A | 2/2021 | |
| CN | 113408753 A | 9/2021 | |
| CN | 113887626 A | 1/2022 | |
| JP | 2019008675 A * | 1/2019 | ......... G05B 13/0265 |
| WO | 2021245834 A1 | 12/2021 | |

OTHER PUBLICATIONS

First Office Action for Chinese Application No. 202210132467.6 mailed on Aug. 14, 2024.
First Search for Chinese Application No. 202210132467.6 mailed on Aug. 2, 2024.
Lv et al., "Study on Tag Portrait Technology Based on Electric Power Big Data and Its Application", China Academic Journal electronic Publishing House, Feb. 16, 2017, English abstract provided.
International Preliminary Report on Patentability Chapter I for PCT Application No. PCT/CN2022/090147 mailed on Aug. 29, 2024.

* cited by examiner

QP001  3 tons
Time of last maintenance 20211011
Rotation speed 1200
Total weight 3000KG  20211011

Sand ratio 1.5
Cumulative maintenance 5 times this year

Pump valve failure

Runtime 200

No cavitation failure    Pump valve high temperature
Crankshaft in good condition
Maximum displacement 3000

Cross head vibration normal
Pump valve low pressure

FIG. 4

METHOD FOR GENERATING PORTRAIT OF MECHANICAL EQUIPMENT

CROSS-REFERENCE TO RELATED APPLICATIONS

The present application is a continuation application of International Application No. PCT/CN2022/090147 filed on Apr. 29, 2022, which claims priority to Chinese Patent Application No. 202210132467.6 filed with China National Intellectual Property Administration on Feb. 14, 2022. The entire contents of all of the above-identified applications are incorporated herein by reference in their entirety.

TECHNICAL FIELD

This application relates to the field of intelligent management technologies for mechanical equipment, and in particular, to a method for generating a portrait of mechanical equipment.

BACKGROUND

Portrait technology is widely used in the Internet and other industries, which mainly uses portraits. Portraits can be used to mine user features, grasp user preferences, and deeply and thoroughly understand and master the portrayed objects. Similarly, large-scale mechanical equipment can also be portrayed like a human being, and feature extraction and comprehensive description of the mechanical equipment can be obtained through the portrait technology. A large amount of monitoring data is generated during delivery, production, and maintenance of the large-scale mechanical equipment. The data can directly reflect remarkable features of the equipment. However, features of the equipment cannot be intuitively recognized and deeply mined by direct reading of the large amount of data.

SUMMARY

Technical Problem to be Resolved

So far, there are relatively few studies on mechanical equipment portraits, and there are even fewer related studies on large-scale mechanical service equipment in the oil and gas industry. Therefore, creating a complete portrait of mechanical equipment is an urgent problem to be resolved. With the continuous accumulation and wide application of equipment data, various large-scale equipment portraits are to be created to help timely and accurately master the dynamics and the operating status of the equipment during production operations.

Technical Solutions

To achieve the foregoing objective, this application provides a method for generating a portrait of mechanical equipment. The method includes: obtaining all data information related to mechanical equipment; performing data fusion on the data information related to the mechanical equipment to obtain a multi-source data information set; obtaining target attribute data and target state data of the mechanical equipment based on the multi-source data information set; generating attribute labels of the mechanical equipment based on the target attribute data; inputting the target state data of the mechanical equipment into a trained neural network model to obtain current state labels of the mechanical equipment, where the current state labels include state label values of the mechanical equipment; generating the equipment portrait of the mechanical equipment with attribute label values of the attribute labels and the state label values of the current state labels; and determining whether the mechanical equipment fails based on the equipment portrait of the mechanical equipment.

Further, the method for generating a portrait of mechanical equipment further includes: initializing the neural network model based on the target state data of the mechanical equipment and a quantity of target state label values of the target state data; generating a plurality of statistical indicators based on the target state data; and inputting a data matrix including the plurality of statistical indicators and state classification label data of the target state data into the neural network model, and training the neural network model.

Further, the obtaining target attribute data and target state data of the mechanical equipment based on the multi-source data information set includes: obtaining initial attribute data and initial state data based on the multi-source data information set; obtaining the target attribute data based on a degree of attention to and/or importance of the initial attribute data; and performing normalization processing on the initial state data to obtain the target state data.

Further, the generating an equipment portrait of the mechanical equipment with attribute label values of the attribute labels and the state label values of the current state labels includes: constructing a set of label values and a set of all equipment based on the attribute label values and the state label values of the mechanical equipment; constructing a co-occurrence matrix based on the set of label values and the set of equipment; obtaining, based on the co-occurrence matrix, label clusters of the attribute labels and the current state labels by using a clustering algorithm; and obtaining key label values of the equipment based on the label clusters, and generating the equipment portrait of the mechanical equipment.

Further, the obtaining current key label values of the equipment based on the label clusters, and generating the equipment portrait of the mechanical equipment includes: comparing label values of each equipment with label values included in the label clusters; and obtaining a first label cluster with a largest quantity of label value categories covered by the label values included in each equipment among the label clusters, and setting corresponding label values in the first label cluster as the key label values of the equipment.

Further, the method for generating a portrait of mechanical equipment further includes: visualizing the generated equipment portrait as a portrait word cloud map.

Further, the method for generating a portrait of mechanical equipment further includes: comparing state label values of the current target state data of the mechanical equipment with set values to obtain the current state labels of the mechanical equipment.

Further, state label values of the current target state data of the mechanical equipment are compared with set values to obtain the current state labels of the mechanical equipment.

Further, the performing data fusion on the data information related to the mechanical equipment to obtain a multi-source data information set includes: setting unique identifiers for each equipment that are different from each other; obtaining a first database table with a unique identifier for each equipment and a second database table associated with the first database table; and associating the first database table with the second database table by using the unique identifier.

Further, the neural network model includes a backpropagation neural network model.

Further, the statistical indicators include: a mean value, a standard deviation, a square root amplitude, an effective value, a peak value, skewness, kurtosis, a maximum value, a margin value, a form factor, or a pulse index.

Further, the state label values include: normal, fault, high, medium, and low.

According to another aspect of this application, a computer device is provided. The computer device includes a memory and a processor, where the memory stores a computer program executable on the processor, and the processor, when executing the computer program, implements the steps of the foregoing method for generating a portrait of mechanical equipment.

According to still another aspect of this application, a non-transitory computer-readable storage medium is provided, which stores a computer program, where the computer program, when executed by a processor, implements the steps of the foregoing method for generating a portrait of mechanical equipment.

Beneficial Effects

According to this application, a customer portrait technology can be applied to equipment (e.g., plunger pump equipment), to construct a relatively complete equipment portrait label system.

Moreover, the label system constructed in this application may include static attributes and instantaneous parameters, and/or parameter state evaluation and maintenance state information. In addition, a method for constructing a current state label of equipment based on a neural network is provided, to obtain labels such as a current health status of the equipment. Moreover, a portrait of the equipment can be obtained, which is helpful for the detection of equipment failures. The current operating status of the equipment can be mastered timely and accurately, which is convenient for controlling the entire production process.

BRIEF DESCRIPTION OF THE DRAWINGS

The accompanying drawings that constitute a part of this application are used to provide a further understanding of this application. Exemplary embodiments of this application and descriptions of the embodiments are used to describe this application, and do not constitute any inappropriate limitation to this application. In the accompanying drawings:

FIG. 4 is a schematic diagram of visualizing a portrait of mechanical equipment as a portrait word cloud map according to an exemplary embodiment of this application.

DETAILED DESCRIPTION

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

In one embodiment, a portrait of the mechanical equipment is constructed, which can be used to accurately mine and extract features of various aspects of the mechanical equipment and present the features comprehensively, to timely understand and master the equipment status and its operating status.

Figure 1:
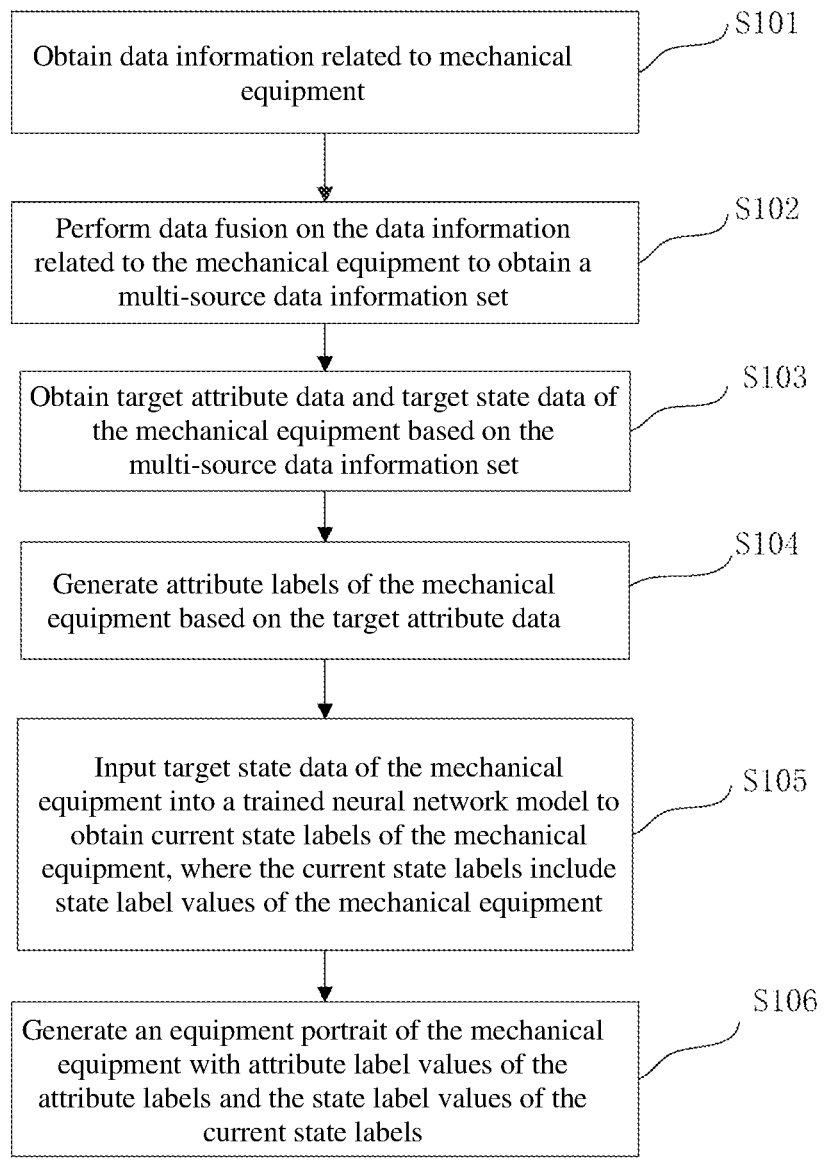
FIG. 1 is a flowchart of a method for generating a portrait of mechanical equipment according to an exemplary embodiment of this application.

According to an embodiment of this application, as shown in FIG. 1, a method for generating a portrait of mechanical equipment is provided. The method includes: obtaining all data information related to mechanical equipment (S101); performing data fusion on the data information related to the mechanical equipment to obtain a multi-source data information set (S102); obtaining target attribute data and target state data of the mechanical equipment based on the multi-source data information set (S103); generating attribute labels of the mechanical equipment based on the target attribute data (S104); inputting the target state data of the mechanical equipment into a trained neural network model to obtain current state labels of the mechanical equipment, where the current state labels include state label values of the mechanical equipment (S105); and generating an equipment portrait of the mechanical equipment with attribute label values of the attribute labels and the state label values of the current state labels (S106).

According to this application, a relatively complete portrait label system can be constructed for mechanical equipment, for example, a plunger pump, which helps timely and accurately master the dynamics and the operating status of the equipment during the production.

The specific process of the method for generating a portrait of mechanical equipment is described in detail below.

S101: Obtaining all data information related to mechanical equipment.

Mechanical equipment is widely used. For example, a plunger pump in the oil and gas equipment service industry is one of the main large-scale mechanical equipment used in the oil and gas industry, and can be used for high-intensity operations such as cementing, acidizing, and fracturing. A large amount of production data and operation and maintenance data are generated in the entire life cycle of mechanical equipment from its production to on-site operations, and to maintenance and scrapping.

Moreover, data involved in the operation of the mechanical equipment is diverse and scattered, and different types of data are scattered in major equipment management systems. Therefore, the data needs to be sorted out, mainly including (but not limited to the following data): equipment file attribute data, equipment production operation data, equipment after-sales maintenance data, and data of various sensors of a real-time equipment monitoring system. Underlying database tables and database table fields of the equipment-related service systems including the foregoing data are sorted, and are used as a data source of a portrait of the mechanical equipment, thereby obtaining all data information related to each mechanical equipment.

A fracturing truck plunger pump at a fracturing well site is used as an example below to illustrate obtaining of data information related to the equipment.

Multi-source data related to the plunger pump and a related data source system are sorted to obtain the following database table:

| Number | Data type | Data source system |
|---|---|---|
| 1 | Plunger pump file data | Equipment production file management system |
| 2 | Plunger pump operating data | Fracturing truck operation monitoring system; plunger pump intelligent detection system |
| 3 | Plunger pump routine maintenance data | Fracturing truck after-sales maintenance management system |
| 4 | Data of various sensors of the plunger pump | Plunger pump intelligent detection system |

The foregoing four types of data belong to a main data range involved in the plunger pump. Therefore, the construction of a plunger pump portrait indicator system are realized based on the foregoing data sources.

S102: Performing data fusion on the data information related to the mechanical equipment to obtain a multi-source data information set.

Service system data related to the mechanical equipment is scattered in various service systems in a multi-source manner, and the data is relatively isolated. Data fusion is required to realize the serialization of multi-source data information.

According to an exemplary embodiment of this application, the foregoing obtained data information is fused by using the following method.

In some embodiments, a unique identifier is determined as a unique identity symbol of each equipment. The unique identifier is different for different equipment, and may be (but not limited to) an "equipment number" when the equipment leaves the factory.

All data tables related to the equipment in the foregoing data information obtained are sorted. The data information is to be all database tables in an underlying structured database of each service system. According to a database table structure (that is, fields included in the database table), a first database table with a unique identifier of the equipment and a second database table that can be associated with the first database table through other fields are summarized.

For example, the two types of database tables are sorted based on, for example, how many first database tables with unique identifiers of the equipment and second database tables that can be associated with the first database tables through other fields are there for each data source information, and what each database table is and what fields are included.

The first database table has a field for the unique identifier of the equipment, and the second database table does not have a field for the unique identifier of the equipment. However, other fields in the second database table can be associated with the first database table.

One or more of the foregoing first database table and second database table may be set. The "first database table" and the "second database table" are used to distinguish whether the database table has a unique identifier of the equipment.

Access permission between the foregoing service system databases (for example, the first database table and the second database table) is provided. The unique identifier of the equipment is used as an associated field. By using database statements, such as structured query language (sql) statements, an association relationship is constructed for each system database table sorted above, to realize the effective fusion of equipment multi-source data indexed by the unique identifier of the equipment.

Figure 2:
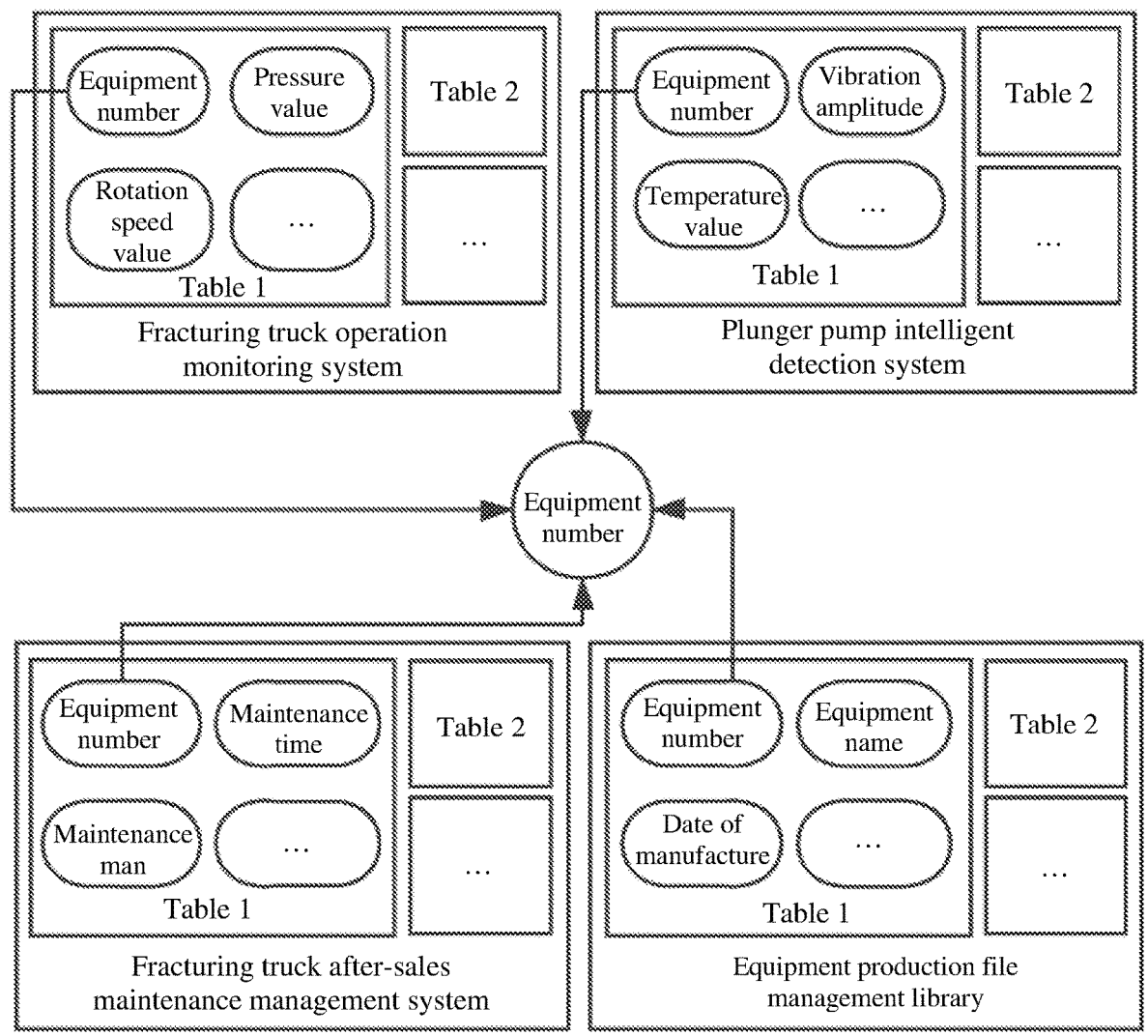
FIG. 2 is a schematic diagram of fusion processing of multi-source data related to mechanical equipment according to an embodiment of this application.

A fracturing truck plunger pump at a fracturing well site is used as an example to illustrate a process of performing data fusion on data information related to a mechanical equipment. FIG. 2 is a schematic diagram of fusion processing of multi-source data related to mechanical equipment according to an embodiment of this application.

As shown in FIG. 2, a "plunger pump equipment number" is used as a unique identifier. Examples of systems and database tables related to the "plunger pump equipment number" include: fracturing truck operation monitoring system, plunger pump intelligent detection system, fracturing truck after-sales maintenance management system, and equipment production file management database. For example, there are 23 fields in an equipment operation parameter table in the fracturing truck after-sales maintenance management system; there are nine fields in an equipment vibration signal record table in the plunger pump intelligent detection system; there are 12 fields in an equipment maintenance record table in the fracturing truck after-sales maintenance management system; and there are 25 fields in an equipment file information table in the equipment production file management database. Based on the unique identifier "plunger pump equipment number," the foregoing four tables are associated, and duplicate fields are removed. After data fusion, a result table includes 61 fields.

Certainly, required fields can be filtered according to different label requirements and placed in an associated result table. In addition, the fields included in the foregoing data fusion table can be deleted or queried according to the label calculation needs.

Through the foregoing operations, a fused equipment multi-source data information set indexed by the unique identifier of the equipment is obtained.

In this application, equipment labels are divided into two categories, which are equipment status hot labels and equipment attribute cold labels. An equipment attribute cold label refers to an attribute label whose label value is an inherent attribute of equipment or does not change once generated. An equipment status hot label refers to a label whose label value changes periodically or irregularly with the equipment status. All labels for mechanical equipment can be classified into the foregoing two categories.

Figure 3:
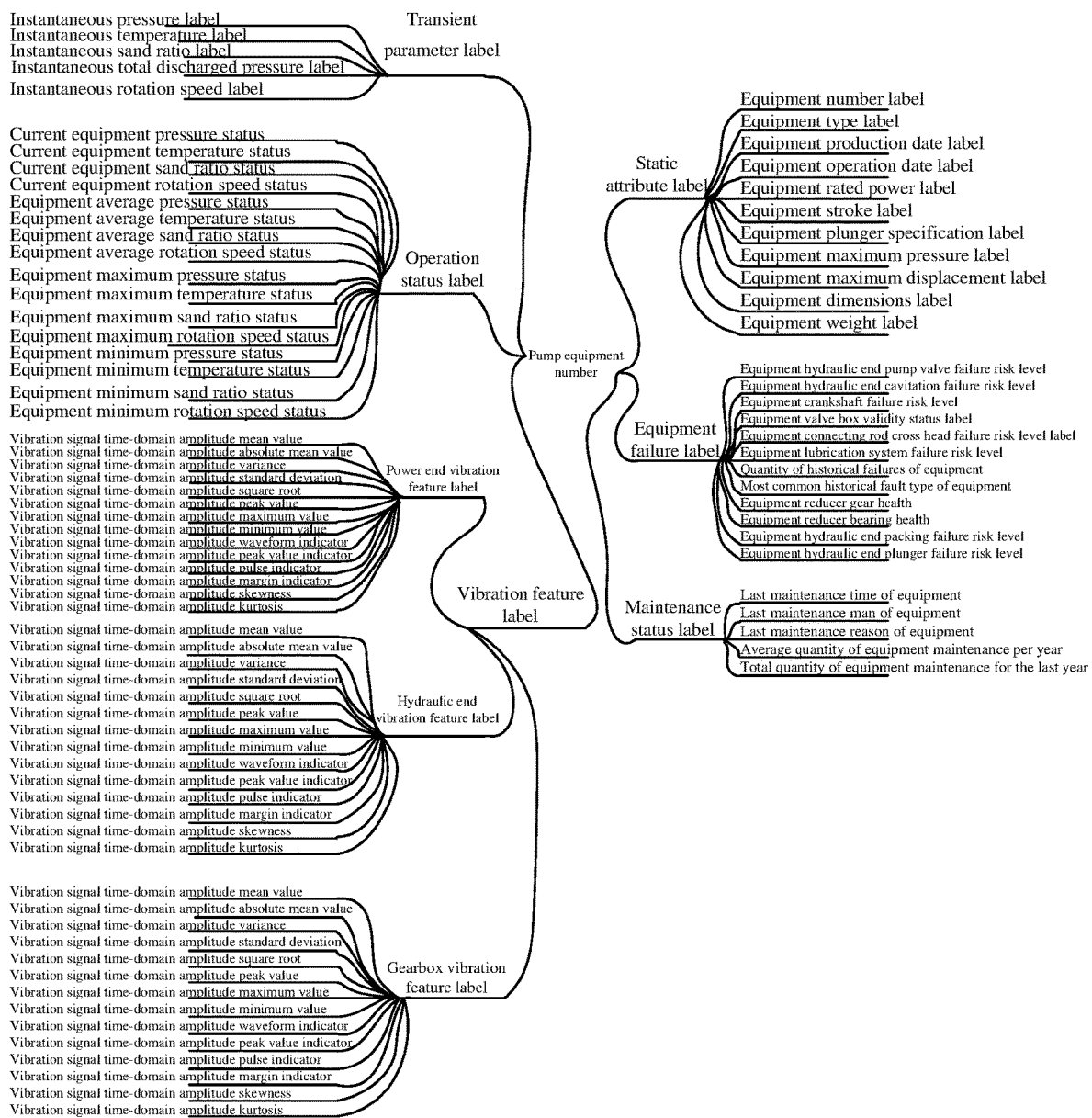
FIG. 3 schematically shows an example of a label system of sample data constructed according to this application.

For example, FIG. 3 schematically shows an example of a label system of sample data constructed according to this application.

For example, equipment attribute cold labels may include: equipment number, equipment type, equipment production date, equipment operation date, equipment rated power, equipment stroke, equipment plunger specification, equipment maximum pressure, equipment maximum displacement, equipment dimensions, equipment weight, and the like.

Equipment status hot labels may include: an equipment health status label (where a label value is normal or faulty), a current equipment pressure status label (where label values include: high, medium, and low), an equipment failure risk level, and the like.

S103: Obtaining target attribute data and target state data of the mechanical equipment based on the multi-source data information set obtained above.

Initial attribute data of the equipment is obtained from the multi-source data information set obtained above. That is, the unique identifier of the equipment is used as an index to retrieve all attribute fields related to the equipment in the multi-source data information set obtained above as the initial attribute data.

Taking a fracturing truck plunger pump at a fracturing well site as an example, the initial attribute data may include (but is not limited to): equipment number, equipment type, equipment production date, equipment operation date, equipment rated power, equipment stroke, equipment plunger specification, equipment maximum pressure, equipment maximum displacement, equipment dimensions, equipment weight, and the like.

Normalization processing is performed on the initial attribute data to obtain the target attribute data. According to an exemplary embodiment of this application, in a standard processing method, based on the experience of experts in the field, the initial attribute data is sorted by a degree of attention and importance, and comprehensive scoring is performed, where a score range is between 0 and 1. In some embodiments, attribute data whose comprehensive score is below 0.8 is removed, and all attribute data whose expert comprehensive scores are greater than 0.8 are used as the target attribute data.

Taking a fracturing truck plunger pump at a fracturing well site as an example, the target attribute data, for example, the initial attribute data whose expert scores are greater than 0.8 according to experience of experts, may include (but is not limited to): equipment number, equipment type, equipment production date, equipment operation date, equipment rated power, equipment stroke, and equipment plunger specification.

Initial state data of the equipment is obtained from the multi-source data information set obtained above. That is, the unique identifier of the equipment is used as an index to retrieve all field data related to the equipment status in the multi-source data information set obtained above as the initial state data.

Taking a fracturing truck plunger pump at a fracturing well site as an example, a plunger pump status may be (but is not limited to) a health status (normal or faulty) of a hydraulic end pump valve of the plunger pump. Status data corresponding to the status may include (but is not limited to): historical hydraulic end single cylinder vibration amplitude data, historical hydraulic end single cylinder temperature value data, and historical hydraulic end single cylinder pressure value data.

In addition, normalization processing is performed on the initial state data. According to an exemplary embodiment of this application, the normalization processing includes MIN-MAX normalization processing on the initial state data, to obtain the target state data.

S104: Generating attribute labels of the equipment based on the obtained target attribute data of the mechanical equipment. For example, direct naming and construction are performed based on a field name in the target attribute data of the equipment; and attribute label data is stored into a structured label database.

Taking a fracturing truck plunger pump at a fracturing well site as an example, attribute labels may include (but are not limited to): equipment number label, equipment type label, equipment production date label, equipment operation date label, equipment rated power label, equipment stroke label, and equipment plunger specification label.

S105: Inputting target state data of the mechanical equipment into a trained neural network model to obtain current state labels of the mechanical equipment.

According to an exemplary embodiment of this application, a backpropagation (BP) neural network is used. Certainly, other neural networks may be alternatively used.

According to historical target state data of the equipment and a quantity of state label values of the equipment, initial values of the neural network such as a quantity of network layers, a quantity of neurons in each layer, a nonlinear activation function of each layer, a connection weight, a quantity of training samples for a single time, a quantity of sample training cycles, a learning rate, a loss function, and an optimizer are optimized.

According to an exemplary embodiment of this application, initial network parameters of the neural network are set as follows:

| Parameter name | Parameter value |
| --- | --- |
| Quantity of network layers | 10 |
| Quantity of neurons in each layer | 20 to 50, and 2 in the last layer |
| Nonlinear activation function | Sigmod |
| Connection weight | Fixed random number |
| Quantity of training samples for a single time | 100 |
| Quantity of sample training cycles | 800 |
| Learning rate | 0.001 |
| Loss function | MSE |
| Optimizer | Adam |

The foregoing BP neural network is trained by using training data.

A fracturing truck plunger pump at a fracturing well site is used as an example to illustrate a training process.

To-be-classified equipment state labels may be (but are not limited to) a health status label of a hydraulic end pump valve of the equipment, where the label value is normal or faulty. The health status data of the hydraulic end pump valve of the equipment may include three indicators: a historical hydraulic end single cylinder vibration amplitude, a historical hydraulic end single cylinder temperature value, and a historical hydraulic end single cylinder pressure value.

Example sample data is 10-hour operation data of target equipment (that is, the hydraulic end pump valve of the equipment) in historical normal and faulty states. Original data is divided into 36000 segments at intervals of 1s. 11 statistical indicators including a mean value, a standard deviation, a square root amplitude, an effective value, a peak value, skewness, kurtosis, a maximum value, a margin value, a form factor, and a pulse index are calculated for each segment of data (that is, historical target state data, including but not limited to a historical hydraulic end single cylinder vibration amplitude, a historical hydraulic end single cylinder temperature value, and a historical hydraulic end single cylinder pressure value) for each indicator.

The 11 statistical indicators of the foregoing vibration amplitude, the 11 statistical indicators of the single cylinder temperature value, the 11 statistical indicators of the single cylinder pressure value, and the faulty or normal data label value of the hydraulic end pump valve of the equipment (that is, state classification label data obtained from the historical target state data of the equipment) are used as columns of a matrix, where there are a total of 11*3+1 columns. 36000 sample data obtained at intervals of is in the normal and faulty states are used as rows of the matrix, where there are a total of 36000*2 rows, to obtain a data matrix of size (36000*2, 11*3+1).

The data matrix obtained above is divided into a training data set and a test data set according to a ratio of 9:1.

The training data set is inputted into a constructed BP neural network model. After being calculated in each layer of the network, the data is outputted to the next neural network layer through an activation function. The last layer outputs a calculation result. The calculation result and the real data are inputted to a loss function. The loss function calculates a loss value. When the loss value is greater than a set threshold, an optimization function updates a network connection weight of each layer in a direction of reducing the loss value in a gradient direction according to a loss value backpropagation value. When the loss function value is less than the set threshold, the neural network training ends, and the network structure and neuron information at all levels are saved, thereby obtaining a trained neural network.

The smaller the set threshold above, the better, e.g., at least less than 0.05.

The current target state data in the foregoing test data set is inputted into the trained neural network model, and a test result (that is, a current state prediction label of the equipment) and test accuracy are outputted. The test accuracy is obtained by calculating an AUC (Area Under the ROC (receiver operating characteristic) Curve) value according to the test result outputted based on the test data and the corresponding real state label. If the test accuracy is less than the set threshold, the model test is completed. If the test accuracy is greater than the threshold, sample data is re-selected to re-perform the foregoing model training and testing.

Based on the foregoing trained neural network model, the target state data of the equipment is inputted, and current state classification of the equipment is predicted and outputted as the current state labels of the equipment. Finally, the current state labels of the equipment are stored in a structured label database.

Taking a fracturing truck plunger pump at a fracturing well site as an example, the example sample data is based on the foregoing experimental data and neural network training steps, and it is calculated that the current hydraulic end pump valve health status label of the target equipment is failure.

In some embodiments, status labels such as a health status of another equipment component or a failure risk level of another equipment can also be calculated by using the foregoing method.

In some embodiments, the current state labels of the equipment may be further obtained in a predefined manner. That is, for the current target state data of the equipment, based on the historical experience of experts, current state classification of the equipment is outputted as the current state labels of the equipment. In addition, the current state labels of the equipment are stored into the structured label database.

Taking a fracturing truck plunger pump at a fracturing well site as an example, the current state labels of the equipment may be obtained in a predefined manner, and may be, but are not limited to, a current pressure status label of the equipment. The label values include: high, medium, and low. For example, α1 and β1 are preset as upper and lower limits of a threshold, and the following label values are set in the predefined manner:

high: current equipment pressure >α1;
medium: β1<=current equipment pressure <=α1; and
low: current equipment pressure <β1.

In some embodiments, taking a fracturing truck plunger pump at a fracturing well site as an example, based on the foregoing portrait label construction method, a label system shown in FIG. 3 can be constructed. As shown in the figure, the label system may include the following labels: transient parameter labels, such as an instantaneous pressure label, an instantaneous temperature label, an instantaneous sand ratio label, and an instantaneous rotation speed label; operation status labels, such as a current equipment pressure status, a current equipment temperature status, and a current equipment sand ratio status; vibration feature labels, for example, power end vibration feature labels such as a vibration signal time-domain amplitude mean value, a vibration signal time-domain amplitude absolute mean value, and a vibration signal time-domain amplitude variance, and hydraulic end vibration feature labels such as a vibration signal time-domain amplitude mean value, a vibration signal time-domain amplitude absolute mean value, and a vibration signal time-domain amplitude variance.

S106: Generating an equipment portrait of the mechanical equipment through attribute label values of the generated attribute labels and the state label values of the obtained current state labels.

According to an exemplary embodiment of this application, an equipment portrait is constructed based on a label value clustering method.

All attribute label values and state label values of the mechanical equipment are obtained. A set X of all label values and a set Y of all equipment within a target area range are created, to construct a co-occurrence matrix (X, Y). If the equipment $Y_i$ has an $X_j$ label value, a value at the corresponding position in the matrix is 1; otherwise, the value is 0. Herein, 1 and 0 are only used as the corresponding status marks of each equipment and each label value, and are used as clustering features according to the correspondence between each equipment and each label value. Therefore, labels with a similar correspondence are clustered into one type, and each type of label is used as a portrait of equipment with the type of label.

Taking a fracturing truck plunger pump at a fracturing well site as an example, an example of the co-occurrence matrix is shown below:

| Y (equipment number)/ X (label (label value)) | QP001 | QP002 | ... | QP023 |
|---|---|---|---|---|
| Pump valve health status (faulty) | 1 | 0 | | 0 |
| Cross head health status (faulty) | 0 | 0 | 0 | 1 |
| Pump valve pressure status (high) | 1 | 0 | 0 | 0 |
| Pump valve temperature status (high) | 1 | 0 | 0 | 0 |
| Cross head vibration status (faulty) | 0 | 0 | 0 | 1 |
| ... | ... | ... | ... | ... |

Using a clustering algorithm such as k-medoid, based on the foregoing label-equipment co-occurrence matrix, various labels are clustered, to finally obtain attribute labels of target attribute data and multi-type label clusters of the current state labels. A quantity of clustering categories may be set as required.

The label values of each equipment are compared with label values included in the label clusters, to obtain a label cluster with a largest quantity of label value categories covered by the label values included in each equipment, and corresponding label values in the label cluster are used as the current key label values of the equipment, to generate an equipment portrait of the equipment.

For example, a first category includes 10 labels such as a pump valve health status (faulty) label, a cross head health status (healthy) label, and a pump valve pressure status (high) label. A second category includes another 15 labels. Equipment A has a total of 100 current labels. To highlight the key points, some labels in a portrait of equipment A are selected. If the 100 labels of equipment A include 20 labels of the first category, that is, all 10 labels of the first category, and include only 5 labels of the second category, the label values of the first category are the most concentrated and most important type of labels for equipment A at the current moment, that is, the foregoing current key labels. Therefore, the portrait of equipment A is generated by using the first category of labels.

In addition, according to an exemplary embodiment of this application, an equipment portrait is visualized as a portrait word cloud map, as shown in FIG. 4. As shown in the figure, the operation status of the equipment can be easily obtained from the figure, to help master the dynamics, operation status, and health status of the equipment.

Figure 5:
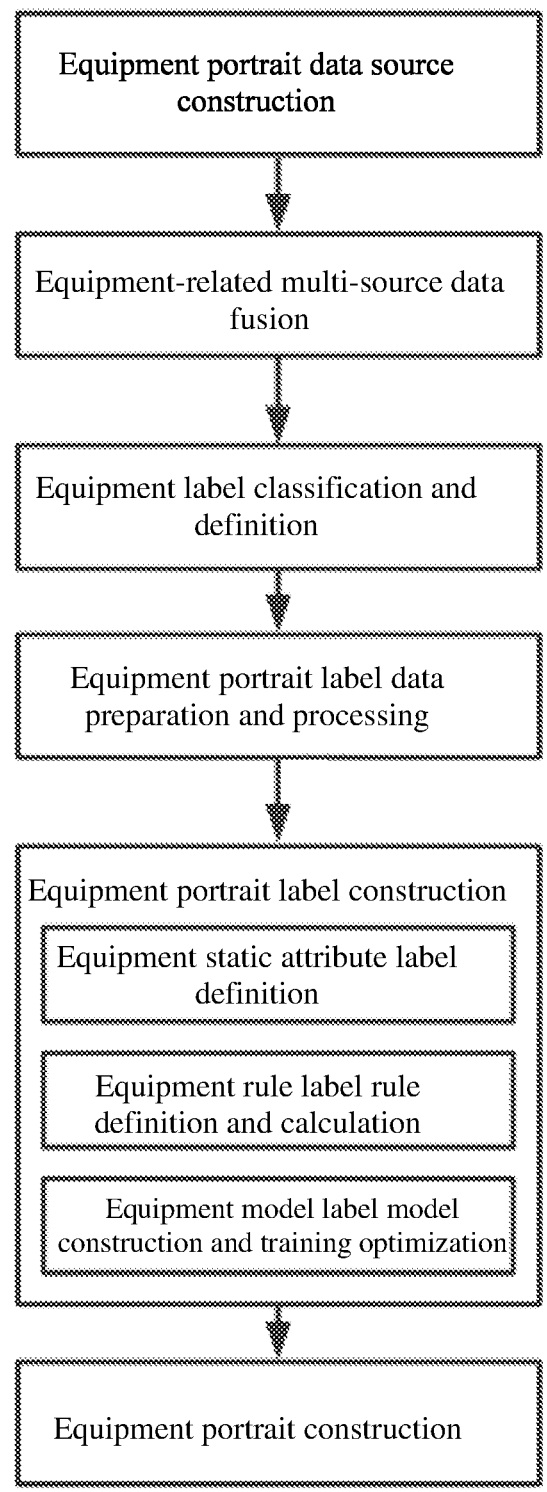
FIG. 5 is a schematic flowchart of a method for generating a portrait of mechanical equipment according to a specific embodiment of this application.

FIG. 5 is a schematic flowchart of a method for generating a portrait of mechanical equipment according to an embodiment of this application.

As shown in the figure, data related to mechanical equipment is obtained according to the method described above, to construct an equipment portrait data source. In some embodiments, all data related to mechanical equipment is obtained.

According to the foregoing method, data fusion is performed on the obtained equipment portrait data source, that is, data related to the mechanical equipment, to obtain a multi-source data information set.

According to the obtained multi-source data information set, the equipment labels are classified, for example, the foregoing equipment attribute labels and equipment status labels.

In addition, preprocessing is performed on the obtained equipment attribute label data and equipment status label data to obtain equipment target attribute labels and equipment target state labels.

An equipment portrait is generated based on the equipment target attribute labels and the equipment target state labels.

Among the labels including the attribute labels and the status labels, the current state labels of the equipment can be obtained through the foregoing constructed neural network model. Certainly, the current state labels of the equipment may be alternatively obtained through a preset threshold according to the experience of experts in the field. According to actual needs, the foregoing two methods can be selected, or the two methods can be used in combination.

Finally, through the obtained equipment target attribute labels and equipment target state labels, the equipment portrait is constructed by using, for example, a label value clustering method. In addition, the data is presented by using a visualization method (for example, a word cloud map).

According to this application, a customer portrait technology may be applied to plunger pump equipment, to construct a relatively complete plunger pump equipment portrait label system.

Moreover, the label system constructed in this application includes not only static attributes and instantaneous parameters, but also state parameter evaluation and maintenance state information. In addition, a method for constructing a current state label of equipment based on a neural network is provided, to obtain labels such as a current health status of the equipment. Finally, a portrait of the equipment is obtained, which can be used for the detection of plunger pump failures. The current operating status of the equipment can be mastered timely and accurately, which is convenient for controlling the entire production process.

A person of ordinary skill in the art may understand that some or all procedures in the foregoing method embodiments may be implemented by a computer program instructing related hardware. The computer program may be stored in a non-transitory computer-readable storage medium, and when the computer program is executed, the procedures of the foregoing methods may be performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The foregoing descriptions are merely embodiments of this application, but are not intended to limit this application. A person skilled in the art may make various alterations and variations to this application. Any modification, equivalent replacement, or improvement made within the spirit and principle of this application shall fall within the protection scope of this application.

What is claimed is:

1. A method for generating an equipment portrait of mechanical equipment, comprising:
    obtaining data information related to the mechanical equipment;
    performing data fusion on the data information related to the mechanical equipment to obtain a multi-source data information set;
    obtaining target attribute data and target state data of the mechanical equipment based on the multi-source data information set;
    generating attribute labels of the mechanical equipment based on the target attribute data;
    inputting the target state data of the mechanical equipment into a trained neural network model to obtain current state labels of the mechanical equipment, wherein the current state labels comprise state label values of the mechanical equipment;
    generating the equipment portrait of the mechanical equipment with attribute label values of the attribute labels and the state label values of the current state labels; and
    determining whether the mechanical equipment fails based on the equipment portrait of the mechanical equipment;

wherein the performing data fusion on the data information related to the mechanical equipment to obtain a multi-source data information set comprises:
  setting unique identifiers for each equipment that are different from each other;
  obtaining a first database table with field of a unique identifier for each equipment and a second database table; and
  in Structured Query Language (SQL), construct an association relationship between the first database table and the second database table by using the unique identifier as an associated field;
wherein the generating the equipment portrait of the mechanical equipment with attribute label values of the attribute labels and the state label values of the current state labels comprises:
  constructing a set of label values and a set of equipment based on the attribute label values and the state label values of the mechanical equipment;
  constructing a co-occurrence matrix based on the set of label values and the set of equipment;
  obtaining, based on the co-occurrence matrix, label clusters of the attribute labels and the current state labels by using a clustering algorithm; and
  obtaining key label values of the equipment based on the label clusters, and generating the equipment portrait of the mechanical equipment.

2. The method according to claim 1, further comprising:
  initializing the neural network model based on the target state data of the mechanical equipment and a quantity of target state label values of the target state data;
  generating a plurality of statistical indicators based on the target state data; and
  inputting a data matrix comprising the plurality of statistical indicators and state classification label data of the target state data into the neural network model, and training the neural network model.

3. The method according to claim 1, wherein the obtaining target attribute data and target state data of the mechanical equipment based on the multi-source data information set comprises:
  obtaining initial attribute data and initial state data based on the multi-source data information set;
  obtaining the target attribute data based on a degree of attention to and/or importance of the initial attribute data; and
  performing normalization processing on the initial state data to obtain the target state data.

4. The method according to claim 1, wherein the obtaining key label values of the equipment based on the label clusters, and generating the equipment portrait of the mechanical equipment comprises:
  comparing label values of each equipment with label values included in the label clusters; and
  obtaining a first label cluster with a largest quantity of label value categories covered by the label values included in each equipment among the label clusters, and setting corresponding label values in the first label cluster as the key label values of the equipment.

5. The method according to claim 1, further comprising:
  visualizing the generated equipment portrait as a portrait word cloud map.

6. The method according to claim 1, further comprising:
  comparing state label values of the target state data of the mechanical equipment with set values to obtain the current state labels of the mechanical equipment.

7. The method according to claim 1, wherein the neural network model comprises a backpropagation neural network model.

8. The method according to claim 2, wherein the statistical indicators comprise: a mean value, a standard deviation, a square root amplitude, an effective value, a peak value, skewness, kurtosis, a maximum value, a margin value, a form factor, or a pulse index.

9. The method according to claim 6, wherein the state label values comprise: normal, fault, high, medium, and low.

10. A computer device, comprising a memory and a processor, wherein the memory stores a computer program executable on the processor, and the processor, when executing the computer program, is configured to perform operations comprising:
  obtaining data information related to mechanical equipment;
  performing data fusion on the data information related to the mechanical equipment to obtain a multi-source data information set;
  obtaining target attribute data and target state data of the mechanical equipment based on the multi-source data information set;
  generating attribute labels of the mechanical equipment based on the target attribute data;
  inputting the target state data of the mechanical equipment into a trained neural network model to obtain current state labels of the mechanical equipment, wherein the current state labels comprise state label values of the mechanical equipment; and
  generating an equipment portrait of the mechanical equipment with attribute label values of the attribute labels and the state label values of the current state labels.

11. The computer device according to claim 10, wherein the operations further comprise:
  initializing the neural network model based on the target state data of the mechanical equipment and a quantity of target state label values of the target state data;
  generating a plurality of statistical indicators based on the target state data; and
  inputting a data matrix comprising the plurality of statistical indicators and state classification label data of the target state data into the neural network model, and training the neural network model.

12. The computer device according to claim 10, wherein the obtaining target attribute data and target state data of the mechanical equipment based on the multi-source data information set comprises:
  obtaining initial attribute data and initial state data based on the multi-source data information set;
  obtaining the target attribute data based on a degree of attention to and/or importance of the initial attribute data; and
  performing normalization processing on the initial state data to obtain the target state data.

13. The computer device according to claim 10, wherein the generating the equipment portrait of the mechanical equipment with attribute label values of the attribute labels and the state label values of the current state labels comprises:
  constructing a set of label values and a set of equipment based on the attribute label values and the state label values of the mechanical equipment;
  constructing a co-occurrence matrix based on the set of label values and the set of equipment;

obtaining, based on the co-occurrence matrix, label clusters of the attribute labels and the current state labels by using a clustering algorithm; and obtaining key label values of the equipment based on the label clusters, and generating the equipment portrait of the mechanical equipment.

14. The computer device according to claim 13, wherein the obtaining key label values of the equipment based on the label clusters, and generating the equipment portrait of the mechanical equipment comprises:

comparing label values of each equipment with label values included in the label clusters; and obtaining a first label cluster with a largest quantity of label value categories covered by the label values included in each equipment among the label clusters, and setting corresponding label values in the first label cluster as the key label values of the equipment.

15. The computer device according to claim 10, wherein the operations further comprise:

visualizing the generated equipment portrait as a portrait word cloud map.

16. The computer device according to claim 10, wherein the operations further comprise:

comparing state label values of the target state data of the mechanical equipment with set values to obtain the current state labels of the mechanical equipment.

17. The computer device according to claim 10, wherein the performing data fusion on the data information related to the mechanical equipment to obtain a multi-source data information set comprises:

setting unique identifiers for each equipment that are different from each other;

obtaining a first database table with a unique identifier for each equipment and a second database table associated with the first database table; and associating the first database table with the second database table by using the unique identifier.

18. A non-transitory computer-readable storage medium, storing a computer program, wherein the computer program, when executed by a processor, causes the processor to perform operations comprising:

obtaining data information related to mechanical equipment;

performing data fusion on the data information related to the mechanical equipment to obtain a multi-source data information set;

obtaining target attribute data and target state data of the mechanical equipment based on the multi-source data information set;

generating attribute labels of the mechanical equipment based on the target attribute data;

inputting the target state data of the mechanical equipment into a trained neural network model to obtain current state labels of the mechanical equipment, wherein the current state labels comprise state label values of the mechanical equipment; and generating an equipment portrait of the mechanical equipment with attribute label values of the attribute labels and the state label values of the current state labels.

* * * * *